United States Patent
Lai et al.

(10) Patent No.: US 10,081,875 B1
(45) Date of Patent: Sep. 25, 2018

(54) ELECTRODEPOSITED COPPER FOIL WITH LOW REPULSIVE FORCE

(71) Applicant: CHANG CHUN PETROCHEMICAL CO., LTD., Taipei (TW)

(72) Inventors: Yao-Sheng Lai, Miaoli (TW); Kuei-Seng Cheng, Miaoli (TW); Jian-Ming Huang, Miaoli (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 15/626,877

(22) Filed: Jun. 19, 2017

Related U.S. Application Data

(63) Continuation of application No. 15/490,608, filed on Apr. 18, 2017.

(51) Int. Cl.
| | |
|---|---|
| *B21C 37/00* | (2006.01) |
| *C25D 1/04* | (2006.01) |
| *C25D 1/20* | (2006.01) |
| *C25D 3/38* | (2006.01) |

(52) U.S. Cl.
CPC ............... *C25D 1/04* (2013.01); *C25D 1/20* (2013.01); *C25D 3/38* (2013.01)

(58) Field of Classification Search
None
See application file for complete search history.

(56) References Cited

U.S. PATENT DOCUMENTS

| | | | |
|---|---|---|---|
| 2008/0176144 A1* | 7/2008 | Iwama | H01M 4/134 429/338 |
| 2010/0038115 A1* | 2/2010 | Matsuda | C25D 1/04 174/254 |
| 2013/0240368 A1 | 9/2013 | Allardyce et al. | |
| 2014/0342178 A1 | 11/2014 | Saito | |
| 2016/0260981 A1* | 9/2016 | Lee | H01M 4/661 |
| 2017/0141404 A1* | 5/2017 | Song | H01M 4/661 |

FOREIGN PATENT DOCUMENTS

JP 5177268 B2 1/2013

* cited by examiner

*Primary Examiner* — Seth M Dumbris
(74) *Attorney, Agent, or Firm* — Nixon Peabody LLP; Thomas P. Pavelko (57) ABSTRACT

The present disclosure relates to a copper foil that exhibits surprising low repulsive force characteristics; and to methods for manufacturing such copper foils. Typically, the copper foil has (a) a lightness L* value of the nodule untreated side, based on the L*a*b color system, in the range of 75 to 90 and (b) a normal tensile strength in the range of 40 kgf/mm$^2$ to 55 kgf/mm$^2$. The disclosure further relates to flexible printed circuit boards and electronic devices using the above-mentioned copper foils for forming conductive lines therein.

15 Claims, 9 Drawing Sheets

Table 2: Measurement on Copper Foil Samples

| Sample | Copper Foil - No Anneal | | Copper Foil - Post Anneal | | | | | Copper Foil on Polymide | |
|---|---|---|---|---|---|---|---|---|---|
| | Normal Tensile Strength kgf/mm² | color L* | Tensile Strength kgf/mm² | Tensile Strength Reduction % | Grain size μm | LAGB % | Repulsive Force g | Curl | |
| | | | | | | | | Curl Heights mm | Max Height mm |
| Example 1 | 54.8 | 75.28 | 35.6 | 35.1 | 4.67 | 3.73 | 13.75 | 2.63/ 2.67/ 2.48/ 2.52 | 2.67 |
| Example 2 | 55.0 | 83.56 | 35.0 | 36.4 | 4.60 | 5.93 | 13.87 | 2.71/ 2.75/ 2.81/ 2.69 | 2.81 |
| Example 3 | 54.5 | 87.35 | 34.7 | 36.3 | 4.52 | 6.48 | 13.99 | 2.85/ 2.90/ 2.90/ 2.96 | 2.96 |
| Example 4 | 47.3 | 76.09 | 26.6 | 43.7 | 5.33 | 3.56 | 13.10 | 1.81/ 1.77/ 1.75/ 1.79 | 1.81 |
| Example 5 | 48.5 | 84.18 | 28.0 | 42.3 | 5.25 | 5.89 | 13.20 | 1.88/ 1.93/ 1.96/ 1.90 | 1.96 |
| Example 6 | 46.7 | 88.78 | 25.9 | 44.5 | 5.18 | 6.91 | 13.45 | 2.25/ 2.18/ 2.27/ 2.20 | 2.27 |
| Example 7 | 40.2 | 78.41 | 20.9 | 47.9 | 7.47 | 3.80 | 12.01 | 0.45/ 0.51/ 0.53/ 0.47 | 0.53 |
| Example 8 | 40.9 | 86.54 | 21.0 | 48.6 | 7.20 | 5.87 | 12.10 | 0.58/ 0.66/ 0.59/ 0.69 | 0.69 |
| Example 9 | 41.1 | 89.23 | 20.6 | 50.0 | 7.17 | 6.98 | 12.65 | 1.31/ 1.35/ 1.35/ 1.38 | 1.38 |
| Comp. example 1 | 60.3 | 81.42 | 42.8 | 29.0 | 3.20 | 5.62 | 17.88 | 7.69/ 7.65/ 7.56/ 7.50 | 7.69 |
| Comp. example 2 | 58.5 | 82.11 | 39.5 | 32.5 | 4.01 | 5.49 | 16.46 | 5.79/ 5.86/ 5.89/ 5.84 | 5.89 |
| Comp. example 3 | 54.2 | 91.93 | 35.0 | 35.4 | 4.47 | 8.47 | 15.52 | 4.65/ 4.71/ 4.75/ 4.60 | 4.75 |
| Comp. example 4 | 40.6 | 93.92 | 20.4 | 49.8 | 7.11 | 7.56 | 14.65 | 3.81/ 3.69/ 3.78/ 3.66 | 3.81 |
| Comp. example 5 | 59.8 | 92.01 | 42.5 | 28.9 | 2.87 | 9.44 | 18.12 | 7.84/ 7.91/ 7.77/ 7.70 | 7.91 |
| Comp. example 6 | 57.9 | 94.20 | 39.8 | 31.3 | 3.45 | 9.20 | 17.55 | 7.04/ 6.95/ 6.88/ 7.10 | 7.10 |

ELECTRODEPOSITED COPPER FOIL WITH LOW REPULSIVE FORCE

CROSS-REFERENCE TO RELATED APPLICATIONS

This application is a continuation of U.S. Non-Provisional patent application Ser. No. 15/490,608, entitled "ELECTRODEPOSITED COPPER FOIL WITH LOW REPULSIVE FORCE" and filed Apr. 18, 2017, the contents of which are incorporated by reference in their entirety as if fully set forth herein.

FIELD OF THE INVENTION

The present disclosure relates to an improved copper foil that exhibits low repulsive force properties; to methods for manufacturing the copper foil; and to use of the copper foil in flexible printed circuits and electronic devices using the same.

BACKGROUND

In general, rolled annealed copper foil has been used extensively in the flexible printed circuits industry. The grain structure and smooth surface is ideal for dynamic, flexible circuitry applications. However, rolled copper typically includes a horizontal grain structure, which can be more challenging for the etching of tight conductor spaces. In contrast, electrodeposited copper foil has a vertical grain structure that can be advantageous for obtaining tight etched spacing and well-defined conductor walls. The standard electrodeposited copper foil typically has a relatively high profile or rough surface as compared to rolled annealed copper foil, which can benefit bonding strength.

A typical device for manufacturing an electrodeposited copper foil comprises a metal cathode drum and an insoluble metal anode, the metal cathode drum being rotatable and having a mirror polished surface. The insoluble metal anode is arranged at approximately the lower half of the metal cathode drum and surrounds the metal cathode drum. A copper foil is continuously manufactured with the device by flowing a copper electrolytic solution between the cathode drum and the anode, applying direct current between these to allow copper to be electrodeposited on the cathode drum, and detaching an electrodeposited copper foil from the cathode drum when a predetermined thickness is obtained.

Copper foil manufactured in this manner is often used as a conductive material for printed wiring boards, including flexible printed circuits. Flexible printed circuits (FPC) refer to printed circuits in which the electronic components for the FPC are mounted or formed on a flexible substrate. As a result, the FPC can conform to a desired shape, or to flex during its use. FPCs have been used generally, for example, as wirings for bending portions of foldable (clamshell type) cellular phones, movable portions of digital cameras, printer heads, etc., and movable portions of equipment relevant to disks such as HDDs (Hard Disk Drives), DVDs (Digital Versatile Disks) and CDs (Compact Disks).

Therefore, at least where FPCs are involved, the flexibility of the copper foil is important from both reliability and manufacturing viewpoints. If the flexibility of the copper foil is not large enough, the bent or deformed copper foil will act as a spring and exert a restorative force against the flexible substrate of the FPC. This is referred to as the repulsive force of the copper foil. If the repulsive force is sufficiently high, the copper foil could delaminate from the flexible substrate during manufacturing or use. Further, when the FPC is connected to another device, a high repulsive force exerted by the copper foil against the flexible substrate could interfere proper bonding of the FPC to another component. Worse, the FPC could debond from this other component. Accordingly, solving the reliability problems and manufacturing problems in FPCs due to the flexibility of the copper foil are of particular interest in the copper foil industry.

SUMMARY

The present disclosure relates to an improved copper foil that exhibits low repulsive force characteristics. As noted above, copper foils with higher repulsive forces that are incorporated into flexible printed circuits can cause manufacturing and reliability problems. The improved copper foils of the present disclosure exhibit lower repulsive forces that alleviate such manufacturing and reliability problems.

More specifically, copper foils exhibiting the following properties have lower repulsive forces: (a) a lightness $L^*$ value of the nodule untreated side, based on the $L^*a^*b$ color system, in the range of 75 to 90; and (b) a normal tensile strength in the range of 40 kgf/mm$^2$ to 55 kgf/mm$^2$. These copper foils may also have a low angle grain boundary (LAGB) percentage, as measured via electron backscatter diffraction (EBSD), of less than 7.0%, a grain size in the range of 4.5 µm to 7.5 µm, and/or a degree of curl, as measured by the lamination curl test, less than 3 mm.

Such copper foils can be useful in, for example, flexible printed circuits, electronic components using such flexible printed circuits, and electronic devices using such electronic components.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The copper foil of the instant disclosure typically has:

(a) a lightness L* value of the nodule untreated side, based on the L*a*b color system, in the range of 75 to 90; and (b) a normal tensile strength in the range of 40 kgf/mm$^2$ to 55 kgf/mm$^2$.

In some cases, the copper foil has a low angle grain boundary (LAGB), as measured by electron backscatter diffraction (EBSD) after an anneal process is performed with the copper foil, of less than 7% in the range of 3.5% to 7%, such as between 3.5, 4.0, 4.5, 5.0, 5.5, 6.0, or 6.5% and 7%; or between 3.5, 4.0, 4.5, 5.0, 5.5, 6.0% and 6.5%; or between 3.5% and 4.0%. The anneal process is described below in greater detail.

Figure 1:
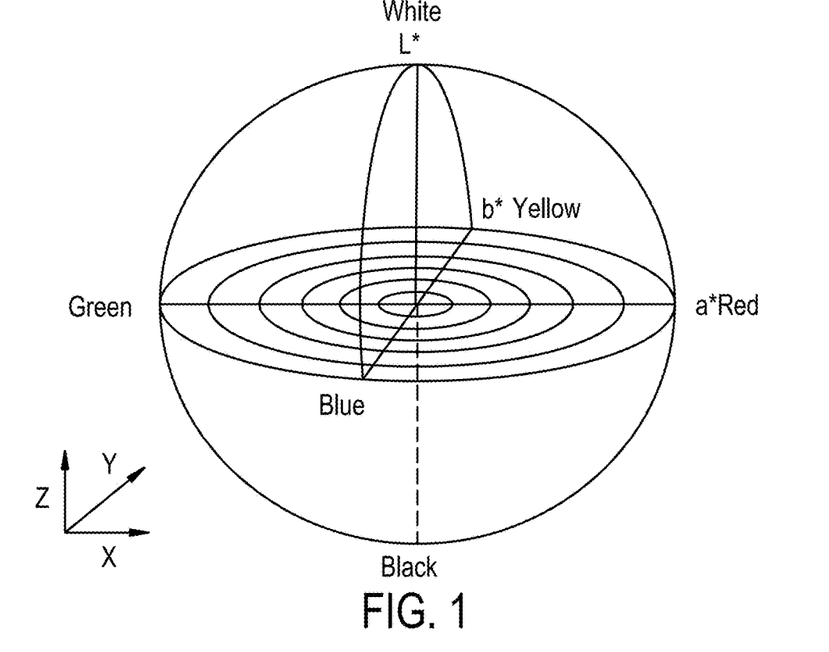
FIGS. 1 and 2 are explanatory views illustrating the $L^*a^*b^*$ colorimetric system.
Figure 2:
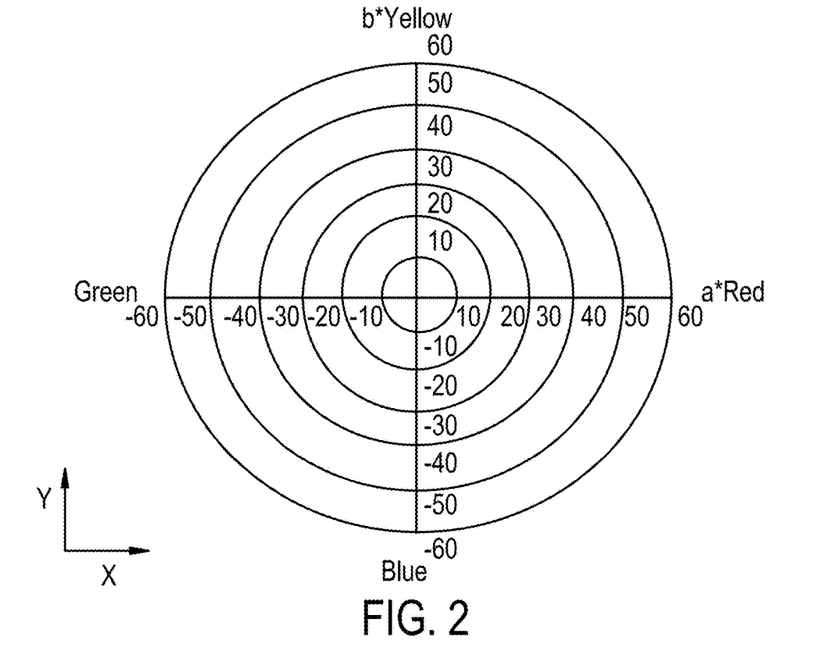

As noted above, the copper foil has a specific color. The color of an object generally relates to three factors: brightness (lightness), hue (color shade), and chroma (clearness). For accurately measuring and expressing these factors, a colorimetric system to objectively express them as values is used. FIGS. 1 and 2 are explanatory views illustrating the L*a*b* colorimetric system. The L*a*b* colorimetric system is a colorimetric system described in JIS Z 8729, and assigns each color to a position in a spherical color space as shown in FIG. 1. In this color space, the brightness is represented by a position in the ordinate (z-axis) direction, the hue is represented by a position in the circumferential direction, and the chroma is represented by a distance from the center axis.

The position on the ordinate (z-axis) representing brightness is designated by L*, and the L* value changes from 0 corresponding to black to 100 corresponding to white. FIG. 2 is a cross-sectional view of the spherical color space horizontally taken along the plane of L*=50. As shown in FIG. 2, the positive direction of the x-axis corresponds to a red direction, the positive direction of the y-axis corresponds to a yellow direction, the negative direction of the x-axis corresponds to a green direction, the negative direction of the y-axis corresponds to a blue direction, and the position on the x-axis is designated by a* of which value changes from −60 to +60 and the position on the y-axis is designated by b* of which value changes from −60 to +60. The hue and chroma are represented by a* value and b* value, respectively.

As noted above, the L* value can be in the range of 75 to 90. The L* values is measured using unannealed copper foil, which is described below in greater detail. However, in some cases, the copper foil has a lightness L* value in the range of 75 to 80, such as between about 75.0, 75.5, 76.0, 76.5, and 77.0 to 77.5, 78.0, 78.5, 79.0, 79.5, and 80; or in the range of 80 to 85, such as between about 80.0, 80.5, 81.0, 81.5, and 82.0 to 82.5, 83.0, 83.5, 84.0, 84.5, and 85; or in the range of 85 to 90, such as between about 85.0, 85.5, 86.0, 86.5, and 87.0 to 87.5, 88.0, 88.5, 89.0, 89.5, and 90.

As noted above, the normal tensile strength of the copper foil can be in the range of 40 kgf/mm$^2$ to 55 kgf/mm$^2$. As used herein, the normal tensile strength refers to the tensile strength of the copper foil, as measured prior to the anneal process described below. However in some cases, the normal tensile strength of the copper foil can be between about 40, 41, 42, 43, 44, 45, 46, 47, or 47.5 kgf/mm$^2$ to about 48, 49, 50, 51, 52, 53, 54, or 55 kgf/mm$^2$.

Tensile strength, as used herein, refers to the maximum stress that a material can withstand while being stretched or pulled before failing or breaking. Tensile strength is not the same as compressive strength and the values can be quite different. Elongation, tensile strength, and roughness are measured using IPC-TM650.

The resulting copper foil is unique in that it does not curl like traditional copper foils. As used herein, the resulting copper foil refers to the copper foil following anneal processes and any other post-manufacturing processes. A more detailed explanation of the manufacture of the copper foils of the present disclosure is provided below. As to the curl properties of the resulting copper foil, the degree of curl, as measured by the lamination curl test, can be less than 3 mm.

However, the degree of curl, as measured by the lamination curl test, may be 2 mm or less, 1.5 mm or less, or 1 mm or less. For example, in some cases, the degree of curl may be between about 2.5 mm and 3.0 mm, between about 1.5 mm and 2.5 mm, or between about 0.5 mm and 1.5 mm. A more detailed discussion of the lamination curl test is provided below.

The resulting copper foil, after being subjected to a pressing with polyimide and heat treatment, also has a repulsive force between about 12 and 14 grams, such as between about 12.0, 12.1, 12.2, 12.3, 12.4, 12.5, 12.6, 12.7, 12.8, and 12.9 grams to about 13.0, 13.1, 13.2, 13.3, 13.4, 13.5, 13.6, 13.7, 13.8, 13.9, and 14.0 grams, where the repulsive force is measured as described below. In addition to the foregoing properties, the copper foil can have a tensile strength in the range of 20 kgf/mm$^2$ to 36 kgf/mm$^2$ after the anneal process (heating at 200° C. for 1 hour) is performed, such as between about 20, 21, 22, 23, 24, 25, 26, 27, or 28 kgf/mm$^2$ to about 29, 30, 31, 32, 33, 34, 35, or 36 kgf/mm$^2$. The heating at 200° C. for 1 hour simulates the heating of the copper foil during the pressing process of the typical manufacturing process.

Further, the copper foil can have grain size between 4.5 and 7.5 μm after the anneal process (heating at 200° C. for 1 hour) is performed, such as between about 4.5, 4.6, 4.7, 4.8, 4.9, 5.0, 5.1, 5.2, 5.3, 5.4, 5.5, 5.6, 5.7, 5.8, and 5.9 μm to about 6.0, 6.1, 6.2, 6.3, 6.4, 6.5, 6.6, 6.7, 6.8, 6.9, 7.0, 7.1, 7.2, 7.3, 7.4, and 7.5 μm.

Additionally, the copper foil can have a reduction in tensile strength between 35% and 50% after the anneal process (heating at 200° C. for 1 hour), such as between about 34%, 35%, 36%, 37%, 38%, 39%, 40%, 41% to about 42%, 43%, 44%, 45%, 46%, 47%, 48%, 49%, and 50%.

The instant disclosure also relates to processes for manufacturing the electrodeposited copper foil. This process for manufacturing the electrodeposited copper foil is described below with respect to FIG. 3.

The manufacturing process involves dissolving Copper wires in a 50 wt % sulfuric acid aqueous solution to prepare a copper sulfate electrolyte containing 320 g/l of copper sulfate (CuSO4.5H2O) and 100 g/l of sulfuric acid. To per liter of the copper sulfate electrolyte, chloride ion were added, so as to provide chloride ion concentrations of 10 ppm to 20 ppm, such as 10 ppm, 15 ppm, or 20 ppm. The chloride ion may be applied by adding hydrochloric acid or a water soluble chlorine-containing compound. For example sodium chloride, potassium chloride, ammonium chloride, and so on can be used as the water soluble. Subsequently, an electrodeposited copper foil with thickness of 12 μm was prepared with a liquid temperature of 45° C. and a current density of 60 A/dm2.

In conventional practices, plating solutions for production of the bare copper foil may contain a number of additives, including accelerators, suppressors, and levelers. Accelerators, alternatively termed brighteners, are additives which increase the rate of the plating reaction. Accelerators are molecules which adsorb on metal surfaces and increase the local current density at a given applied voltage. Accelerators may contain pendant sulfur atoms, which are understood to participate in the cupric ion reduction reaction and thus strongly influence the nucleation and surface growth of metal films. Accelerator additives are commonly derivatives of mercaptopropanesulfonic acid (MPS), dimercaptopropanesulfonic acid (DPS), or bis(3-sulfopropyl)disulfide (SPS), although other compounds can be used. Suppressors, alternatively termed carriers, are polymers that tend to suppress current after they adsorb onto the metal surface. Suppressors may be derived from animal gelatin, hydroxyethyl cellulose (HEC), polyethylene glycol (PEG), polypropylene glycol (PPG), polyethylene oxide, or their derivatives or co-polymers. Levelers generally are cationic surfactants and dyes which suppress current at locations where their mass transfer rate are most rapid.

Normally, it is considered that organic additives have the effect of inhibiting the growth of crystals, and are incorporated into the grain boundaries. In this case, the greater the quantity of organic additive incorporated into the crystal grain boundaries, the smaller the grain size would be. To avoid the interference of additives, except chloride ion, there is no organic or metallic compounds were intentionally added into the copper sulfate electrolyte.

Figure 3:
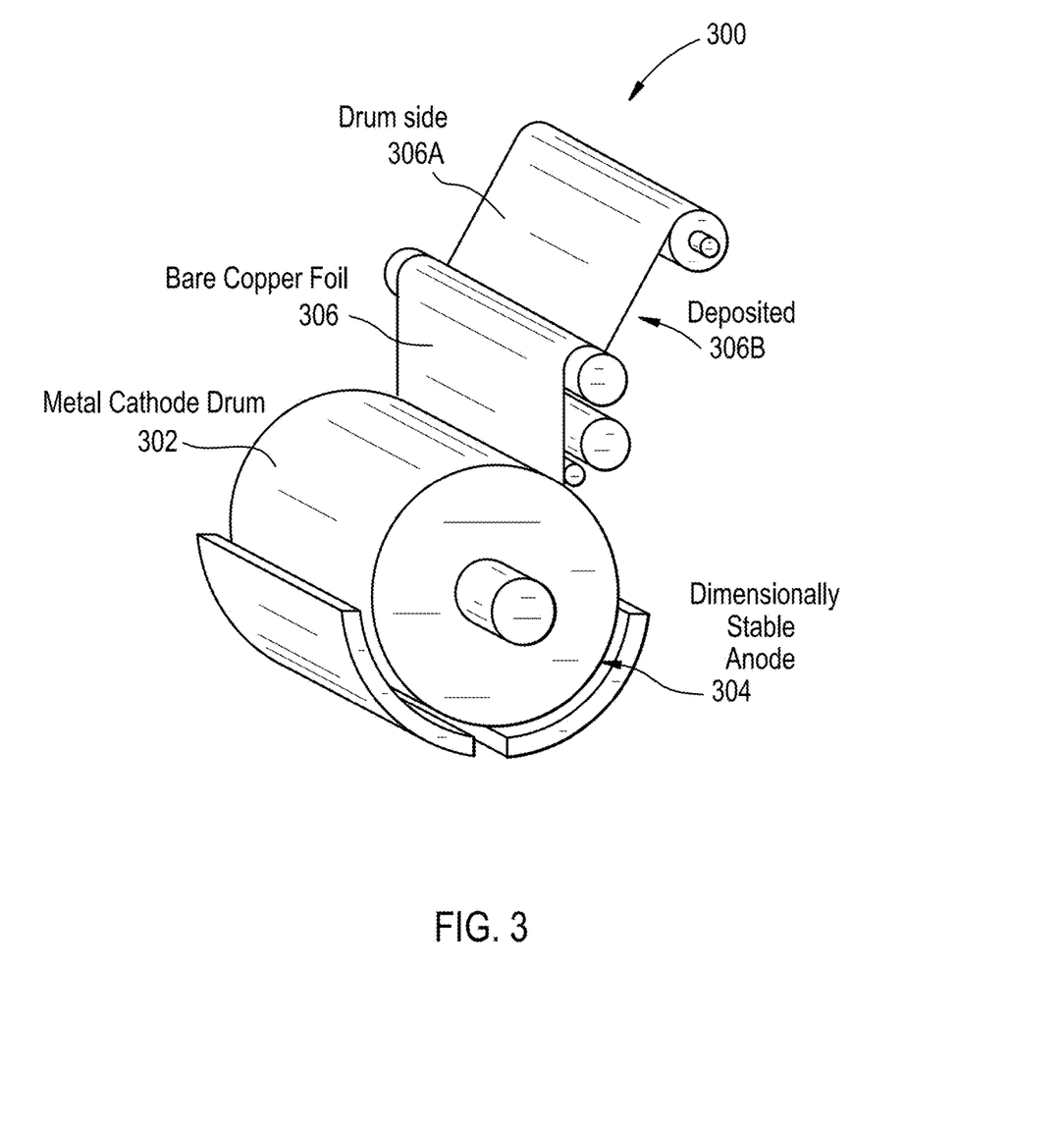
FIG. 3 shows a typical device for manufacturing an electrodeposited copper foil.

A typical device 300 for manufacturing an electrodeposited copper foil is illustrated in FIG. 3. As shown in FIG. 3, device 300 includes a metal cathode drum 302 and a dimensionally stable anode (DSA) 304. The metal cathode drum 302 is rotatable and has a mirror polished surface. The dimensionally stable anode (DSA) 304 is arranged with respect to the metal cathode drum 302 to surround approximately a lower half of the metal cathode drum 302, as illustrated in FIG. 3. A copper foil is continuously manufactured with the device 300 by flowing a copper electrolytic solution between the metal cathode drum 302 and the dimensionally stable anode (DSA) 304 and applying an electrical current between these two components, which allows copper ion from the copper electrolytic solution to be electrodeposited on the metal cathode drum 302. The initial electrodeposited ("bare") copper foil 306 is then detached from the metal cathode drum 302 when a predetermined thickness is obtained.

The bare copper foil 306 is so produced so that it has a drum side 306A (the surface of the copper foil formed on the metal cathode drum 302) and a deposited side 306B (the surface of the copper foil in contact with the copper electrolytic solution between the metal cathode drum 302 and the dimensionally stable anode (DSA) 304) which is on the surface of the copper foil 306 opposite the drum side 306A.

Following the production of the bare copper foil, the bare copper foil can be subjected to a post-electrodeposition surface treatment process. These treatments can involve directing the bare copper foil using a series of treatment vessels (with and without electrodes) and/or ovens. An exemplary post-electrodeposition surface treatment process 400 is described below with respect to FIG. 4. A legend is provided in FIG. 4 to facilitate understanding of the elements illustrated in FIG. 4

At the beginning of the process 400, the bare foil can be directed, via a series of rollers, into an acid washing/cleaning process (402). In the acid washing process, the inside of an acid washing vessel can be filled with a copper electrolytic solution, such as 130 g/L copper sulfate and 50 g/L sulfuric acid, and the temperature of the electrolyte solution was maintained at 27° C. The bare foil was soaked into the copper electrolytic solution for 30 seconds to remove the oil, fat and oxide on the surface and then the bare foil was washed with water (washing not illustrated in FIG. 4).

Figure 4:
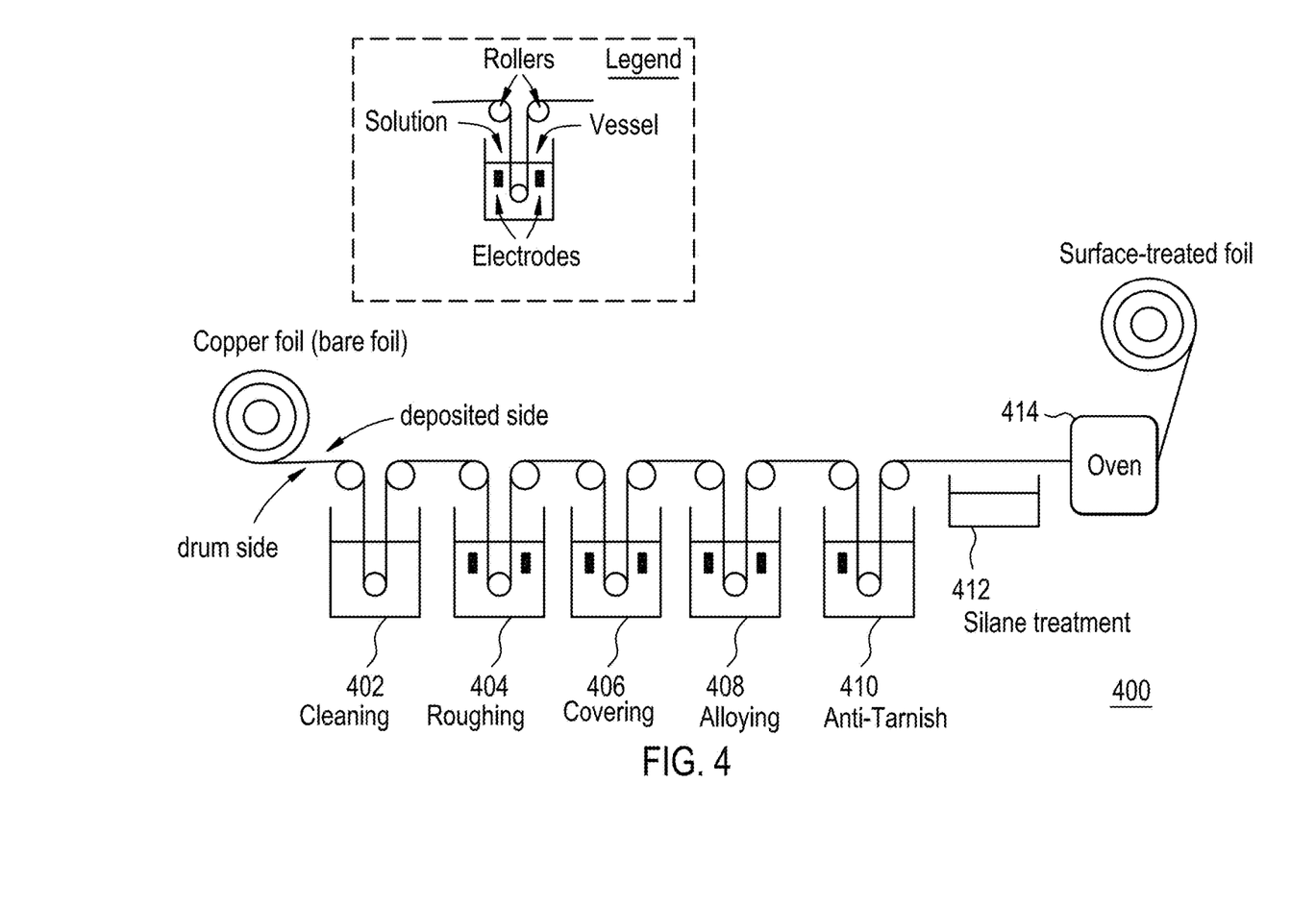
FIG. 4 shows a process for treating a surface of a bare copper foil.

The bare copper foil can then be roughened to form a copper nodular layer (404). The copper nodular layer can be formed by directing the bare copper foil into an electroplating bath and electroplating additional copper onto the surface of the drum side or deposited side of bare copper foil. For the formation of the copper nodular layer, a copper sulfate and sulfuric acid solution can be used for the electroplating. In one exemplary configuration, the concentration of copper sulfate and sulfuric acid in the solution were 70 g/L and 100 g/L, respectively, and the solution temperature was maintained at. 25° C. For the electrodeposition itself, electrolysis was conducted for 10 seconds at a current density of 10 A/dm$^2$.

After the roughening, a cover plating process can be conducted for preventing the exfoliation of the copper nodule layer (406). The cover plating process can involve using a copper sulfate and sulfuric acid solution for the electroplating. In one exemplary configuration, the concentrations of copper sulfate and sulfuric acid were 320 g/L and 100 g/L, respectively, and the temperature of electrolyte solution was maintained at 40° C. For the plating, the current density of 15 A/dm$^2$ was provided.

The cover plating process can then be followed by an alloying process (408) in order to form a passivation layer for the roughened copper foil. The passivation layer is formed on both sides of the roughened copper foil. In one exemplary configuration, zinc can be used as the passivation element and a plating process can be used to simultaneously alloy both sides of the roughened copper foil. To add zinc, a zinc sulfate solution can be used as the electrolyte. Such a zinc sulfate solution can have a zinc sulfate concentration at 100 g/L with a pH of 3.4 and the solution temperature can be set at 50° C. A current density of 4 A/dm$^2$ can then be used for the alloying process. A washing process with water can then be performed (not illustrated in FIG. 4).

Following the alloying process, an anti-tarnish process (410) can be performed to provide rust-proofing. In the case of a zinc-based passivation, a subsequent chromate passivation can be performed. That is, a chromate layer can be electrolytically formed on the zinc passivation layer. In one exemplary configuration, this can be performed using a chromic acid solution with a concentration of 5 g/L and a pH 11.5, while maintained at a temperature of 35° C. The electrolysis can then be performed using a current density of 10 A/dm$^2$. Like the zinc passivation, the electrolytic chromate passivation is also applied to both sides of the copper foil.

Despite chromic anti-tarnish, an organic solution is also suitable for rust-poofing. The organic anti-tarnish layer may comprise at least one member selected from the group consisting of triazoles, thiazoles, and imidazoles, or their derivatives, which are selected for their ability to bond to copper. The triazole group includes orthotriazole (1, 2, 3-triazole) and isomers thereof, or derivatives thereof. Orthotriazole derivatives include benzotriazole, tolyltriazole, carboxybenzotriazole, chlorine substituted benzotriazole, aminotriazole and isomers thereof, or derivatives such as alkali metal salts or amine salts and the like. As the isomers of the aminotriazole, 3-amino-1,2,4-triazole, 2-amino-1,3,4-triazole, 4-amino-1,2,4-triazole and 1-amino-1,3,4-triazole can be used. Examples of derivatives of aminotriazole include sodium salts or amine salts including, for example, monoethanolamine salts, cyclohexylamine salts, diisopropylamine salts, morpholine salts and the like.

Upon completion of the anti-tarnish treatment, the passivated copper foil can be washed with water (not illustrated in FIG. 4) and immediately, without drying the passivated copper foil surfaces, a silane treatment (412) can be provided. In particular, the passivated copper foil is treated such that adsorption of a silane coupling agent is made only on the Zn/Cr passivated layer of copper nodular layer in a silane coupling agent treatment vessel. In one exemplary configuration, the silane treatment is performed using a solution with a concentration of 0.25% 3-Aminopropyltriethoxysilane and spraying the solution against the copper nodular side of the copper foil surface.

Further, the silane coupling agent layer may be formed using epoxy silane, amino silane, methacryloxy silane, vinyl silane, a silane coupling agent such as mercapto-type silane. It is to be noted that such a silane coupling agent, may also be used as a mixture of two or more. Among them, it is preferable that formed using an amino-based silane coupling agent or an epoxy type silane coupling agent.

The amino silane coupling agent referred to herein, N-(2-aminoethyl)-3-aminopropyltrimethoxysilane, 3-(N-styrylmethyl-2-aminoethylamino) propyl trimethoxy silane, 3-aminopropyltriethoxysilane, bis (2-hydroxyethyl)-3-aminopropyltriethoxysilane, aminopropyltrimethoxysilane, N-methyl-aminopropyltrimethoxysilane, N-phenyl-aminopropyltrimethoxysilane, N-(3-acryloxy-2-hydroxypropyl)-3-aminopropyltriethoxysilane, 4-aminobutyl triethoxysilane, (aminoethyl aminomethyl) phenethyl trimethoxy silane, N-(2-aminoethyl-3-aminopropyl) trimethoxysilane, N-(2-aminoethyl-3-aminopropyl) tris (2-ethylhexoxy) silane, 6-(aminohexyl aminopropyl) trimethoxy silane, aminophenyl trimethoxy silane, 3-(1-aminopropoxy)-3,3-dimethyl-1-propenyl trimethoxy silane, 3-aminopropyl tris (methoxyethoxy) silane, 3-aminopropyltriethoxysilane, 3-aminopropyltrimethoxysilane, .omega.-amino-undecyl trimethoxysilane silane, 3-(2-N-benzyl-aminoethyl amino-propyl) trimethoxy silane, bis (2-hydroxyethyl)-3-aminopropyltriethoxysilane, (N, N-diethyl-3-aminopropyl) trimethoxysilane, (N, N-dimethyl-3-aminopropyl) trimethoxysilane, N-methyl-aminopropyltrimethoxysilane, N-phenyl-aminopropyltrimethoxysilane, 3-(N-styrylmethyl-2-aminoethylamino) propyl trimethoxysilane, it is those selected from the group consisting of.

Finally, the copper foil can be dried and, optionally, annealed (414) in an oven. The copper foil can then be cut and wound, as needed for packing and shipping purposes.

It should be noted that the present disclosure contemplates that the process and conditions specified above are solely for ease of illustration and explanation. Further, any values stated above are approximate. That is, the present disclosure contemplates that any of the values specified above can vary form the state value. For example, a particular value can vary by ±5%, ±10%, ±15%, or even ±20% from the stated value.

EXAMPLES

The examples shown here are not intended to limit the various embodiments. Rather they are presented solely for illustrative purposes.

Manufacture

Various copper foils manufactured, including copper foils in accordance with the present disclosure. Nine (9) copper foils were manufactured in accordance with the present disclosure, as described above. Six (6) copper foils were manufactured in accordance with conventional copper foil manufacturing processes, similar to that described above, but varied as indicated below.

For the conventional copper foil manufacturing process, the initial copper plating process was performed using a plating solution with 0 ppm to 5 ppm chloride ion concentration and using a current density of 70 A/dm$^2$ or a plating solution with 0 ppm to 20 ppm chloride ion concentration and using a current density of 85 A/dm$^2$. For the copper foils manufactured in accordance with the present disclosure, the initial copper plating process was performed using a plating solution with 10 ppm, 15 ppm, or 20 ppm chloride ion concentration and using a current density of 60 A/dm$^2$, 70 A/dm$^2$ or 80 A/dm$^2$.

The exact conditions for each copper foil manufactured are shown below in Table 1, with "Example n" identifying a copper foil manufactured in accordance with the present disclosure and "Comp. Example n" identifying a copper foils were manufactured in accordance with a conventional copper foil manufacturing process.

TABLE 1

Copper Plating Process conditions

| Sample | [Cl$^-$] ppm | Current Density A/dm$^2$ |
| --- | --- | --- |
| Example 1 | 10 | 60 |
| Example 2 | 10 | 70 |
| Example 3 | 10 | 80 |
| Example 4 | 15 | 60 |
| Example 5 | 15 | 70 |
| Example 6 | 15 | 80 |
| Example 7 | 20 | 60 |
| Example 8 | 20 | 70 |
| Example 9 | 20 | 80 |
| Comp. example 1 | 0 | 70 |
| Comp. example 2 | 5 | 70 |
| Comp. example 3 | 10 | 85 |
| Comp. example 4 | 20 | 85 |
| Comp. example 5 | 0 | 85 |
| Comp. example 6 | 5 | 85 |

Measurements

The following measurements were then performed for each of the copper foils manufactured.

Normal Tensile Strength. Tensile strength was measured according to IPC-TM-650. The copper foils, subsequent to surface treatment but without any annealing or pressing, were cut to obtain a test sample in the size of 100 mm×12.7 mm (length×width). The test sample was measured at room temperature (about 25° C.) under the conditions of a chuck distance of 50 mm and a crosshead speed of 50 mm/min by using Model AG-I testing machine of Shimadzu Corporation.

Tensile Strength After Annealing. The copper foils, subsequent to surface treatment but without any annealing or pressing, were cut to obtain a test sample in the size of 100 mm×12.7 mm (length×width). Then the test samples were put in an oven, with no purging applied. The anneal condition was set at 200° C. for 1 hour. After annealing, the test sample was measured at room temperature (about 25° C.) under the conditions of a chuck distance of 50 mm and a crosshead speed of 50 mm/min by using Model AG-I testing machine of Shimadzu Corporation. Additionally, the reduction in tensile strength with respect to the normal tensile strength was calculated.

Figure 5:
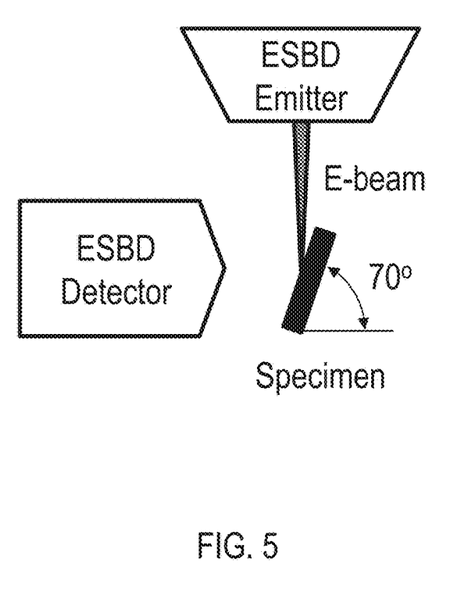
FIG. 5 is a method for measuring grain size.

Grain size after annealing. Grain size on annealed samples of the copper foils (200° C. anneal for 1 hour) was measured using an Electron backscatter diffraction (EBSD) method. In particular, the cross-section of an annealed copper foil sample was analyzed using EBSD to obtain the surface area, i.e., boundaries, of grains in the copper foil sample. Thereafter, this information can be used to calculate maximum grain size values for the copper foil sample. EBSD was conducted using Oxford Instruments NordlyNano scanning electron microscope with a field emission gun operated at 15 kV to characterize grain boundaries and grain size. The EBSD sample is tilted at approximately 70° relative to normal incidence of the electron beam. This configuration is schematically illustrated in FIG. 5.

Low Angle Grain Boundary (LAGB). The EBSD data was also used to identify a LAGB values for the above annealed samples of the copper foils. In particular, the EBSD data was also used to identify grain boundaries with angles between 2 degrees and 15 degrees. Thereafter, the LAGB values obtained represent the percentage of such grain boundaries in the annealed samples.

Color L*. The color L*a*b* measurements were conducted on unannealed samples of the copper foils based on the method of JIS Z 8722 (2000) using a spectrophotometer (Konica Minolta; CM2500c) ("Methods of color measurement—Reflecting and transmitting objects"). The color measurements are based on nodule untreated side because there are many nodules on nodule layer treated side, which may affect the reflection.

Repulsive Force. The measurement of repulsive force involves measuring repulsive force according to the lamination repulsive force test. As used herein, the term "lamination repulsive force test" refers to the process for laminated sample preparation and subsequent measurement described below.

Figure 6A:
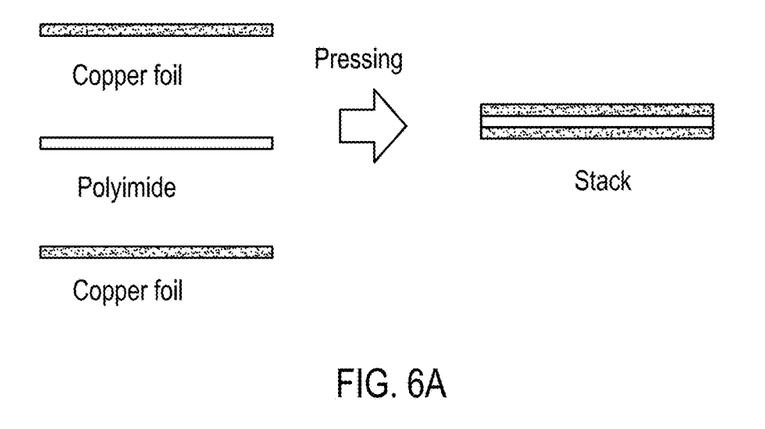
FIGS. 6A, 6B, 6C, and 6D, illustrate a process for measuring a repulsive force of a copper foil.

The laminated sample preparation involves obtaining first and second sections of the copper foil, unannealed, each measuring greater than 10 mm by 70 mm, such as 20 cm by 20 cm, and a section of polyimide (KANEKA FRS-142#SW) of a thickness of about 25 µm, also measuring greater than 10 mm by 70 mm, such as 20 cm by 20 cm. The sections of copper foil are substantially the same thickness, i.e., less than a 10% difference between the thicknesses. The thickness of the copper sections can be between about 9 µm and 30 µm, such as between about 12 µm and 25 µm, or between about 12 µm and 18 µm. These sections are then arranged to form a copper foil/polyimide/copper foil stack, as shown in FIG. 6A. The stack is then pressed together. The pressing process consists of subjecting the materials to a pressure of 600 psi, while adjusting the temperature from 150° C. to 330° C. at a rate of 3° C./min. It should be noted that the pressing process has substantially the same effect on the copper foil as the anneal process for the other measurements.

Figure 6B:
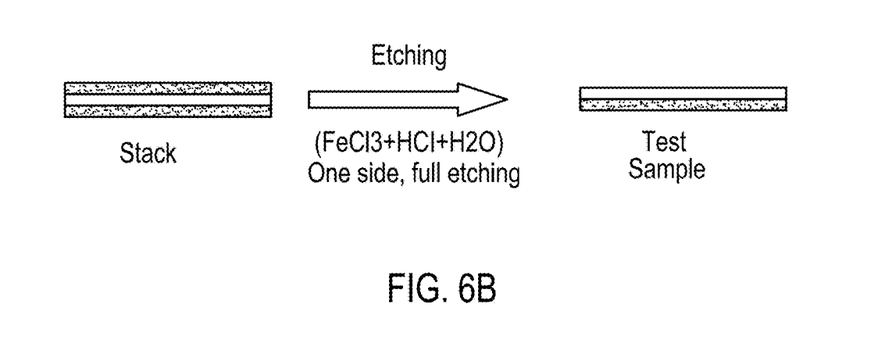

Thereafter, as shown in FIG. 6B, one of the copper foil sections is fully etched off, using a solution of $FeCl_3$, HCl, and water, thus leaving only a stack of one layer of copper foil and polyimide. The etching solution consisted of $FeCl_3$:$HCl$:$H_2O$, in a ratio of 1:1:1 by weight. For the etching process itself, the solution is sprayed onto one side of the stack for 4 minutes, while the temperature is maintained at 25° C. Thereafter, the resulting stack of materials is cut into a 10 mm by 70 mm section. At this point the sample is ready for measurement.

Figure 6C:
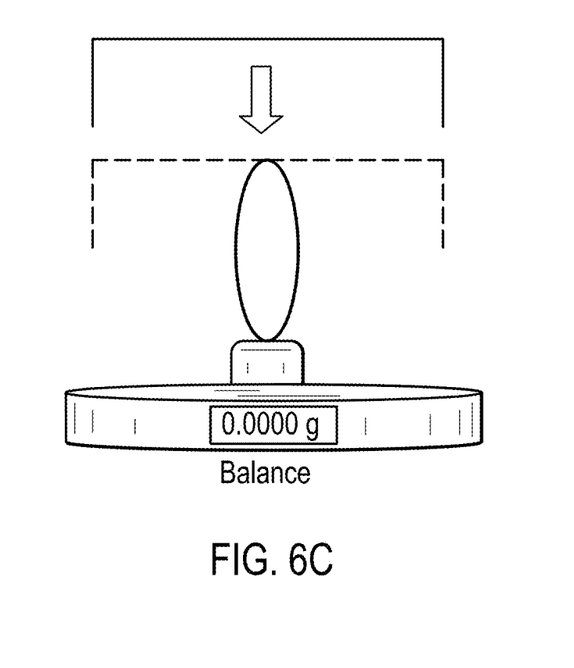
Figure 6D:
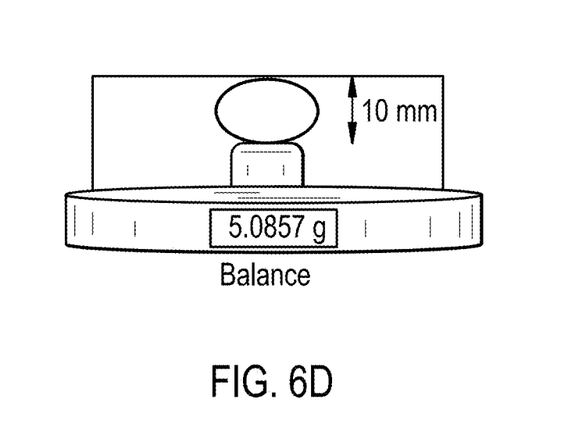

The measurement process first involves arranging the sample in a loop or circle while both edges were adhered by double-sided tape. The loop is then positioned on plate of a balance or scale and the weight is zeroed. A cap is then positioned over the scale to apply force to the circle, as shown in FIG. 6C. The cap is pushed down until reaching the ground. At that moment, the space between the bottom of the cap and the top of the plate is 10 mm, as shown in FIG. 6D. For purposes of measurement, the scale and cap should be configured so that noted that the bottom of the cap is located on the area other than the measuring plate. In this way, the weight of the cap is not included in the measurement. The values shown by the scale or balance thus only include the repulsive force demonstrated by the loop after being pushed. Afterward, the value reported by the scale is recorded and used as the repulsive force value.

Curl. Determining the degree of curl involves measuring curl according to the lamination curl test. As used herein, the term "lamination curl test" refers to the process for laminated sample preparation and subsequent measurement described below.

The laminated sample preparation for the lamination curl test involves preparing a sample in substantially the same way as for repulsive force measurement. However, for the lamination curl test, the sections of copper foil and polyimide are cut, prior to pressing, are greater than 100 mm by 100 mm and, after pressing, the resulting stack is cut into a 100 mm by 100 mm section prior to etching of the copper foil. Thereafter, the stack is placed against a solid plastic board with the copper foil facing upward. A sheet of paper having a 10 cm by 10 cm cross drawn upon it was placed on top of the copper foil. A knife is then used to slice through the paper and the underlying stack along the lines of the 10 cm by 10 cm cross drawn upon the paper. A ruler was used to help stabilize the knife during the cutting process and ensure that the cut was straight. The paper was then lifted from the stack and the corners of the copper foil resulting from the cuts were allowed to freely curl upward. A ruler was used to measure the resulting curled height of each of the four corners. The largest or maximum of the four curled heights is then used as the measure of the degree of curl for the sample.

Figure 7:
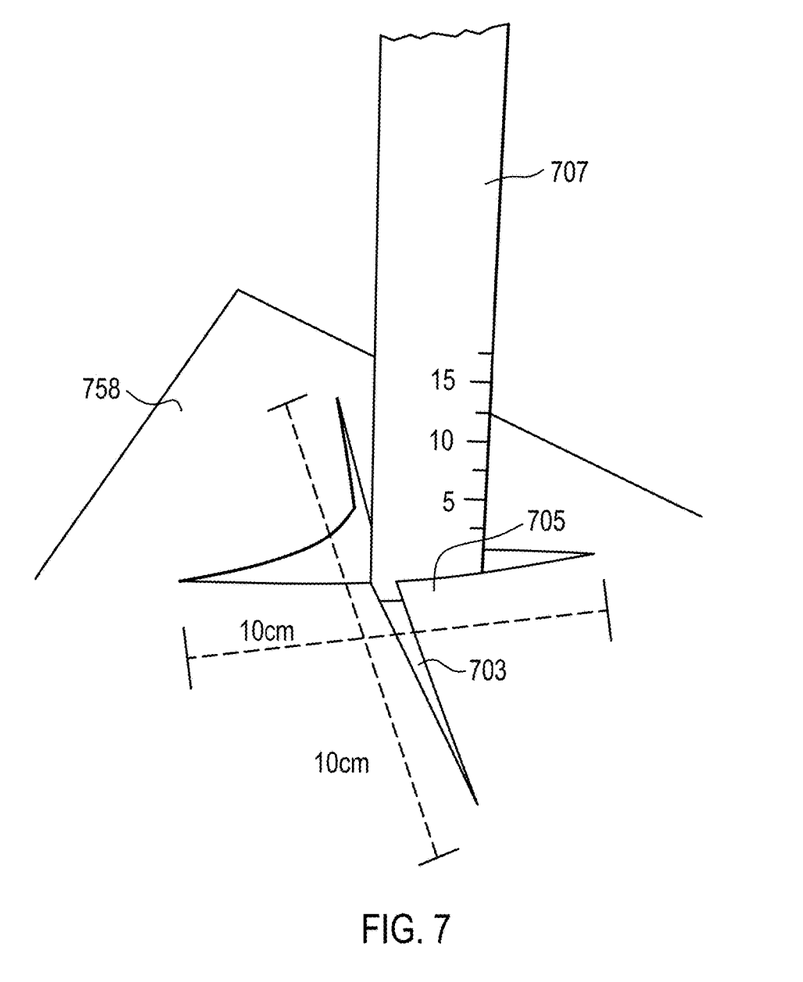
FIG. 7 illustrates a method for measuring a degree of curl.

FIG. 7 is a schematic showing a ruler 707 placed into the opening created by a cross-shaped slit 703 in copper foil 758. The ruler 707 is used to measure the maximum height of the curl at corners 705. If the amount of curl is less than 3 mm, the copper foil is said to be significantly resistant to curling. This represents a low repulsive force. If the amount of curl is between above 3 mm, the copper foil is said to be prone to curling. This represents a high repulsive force.

Figure 8:
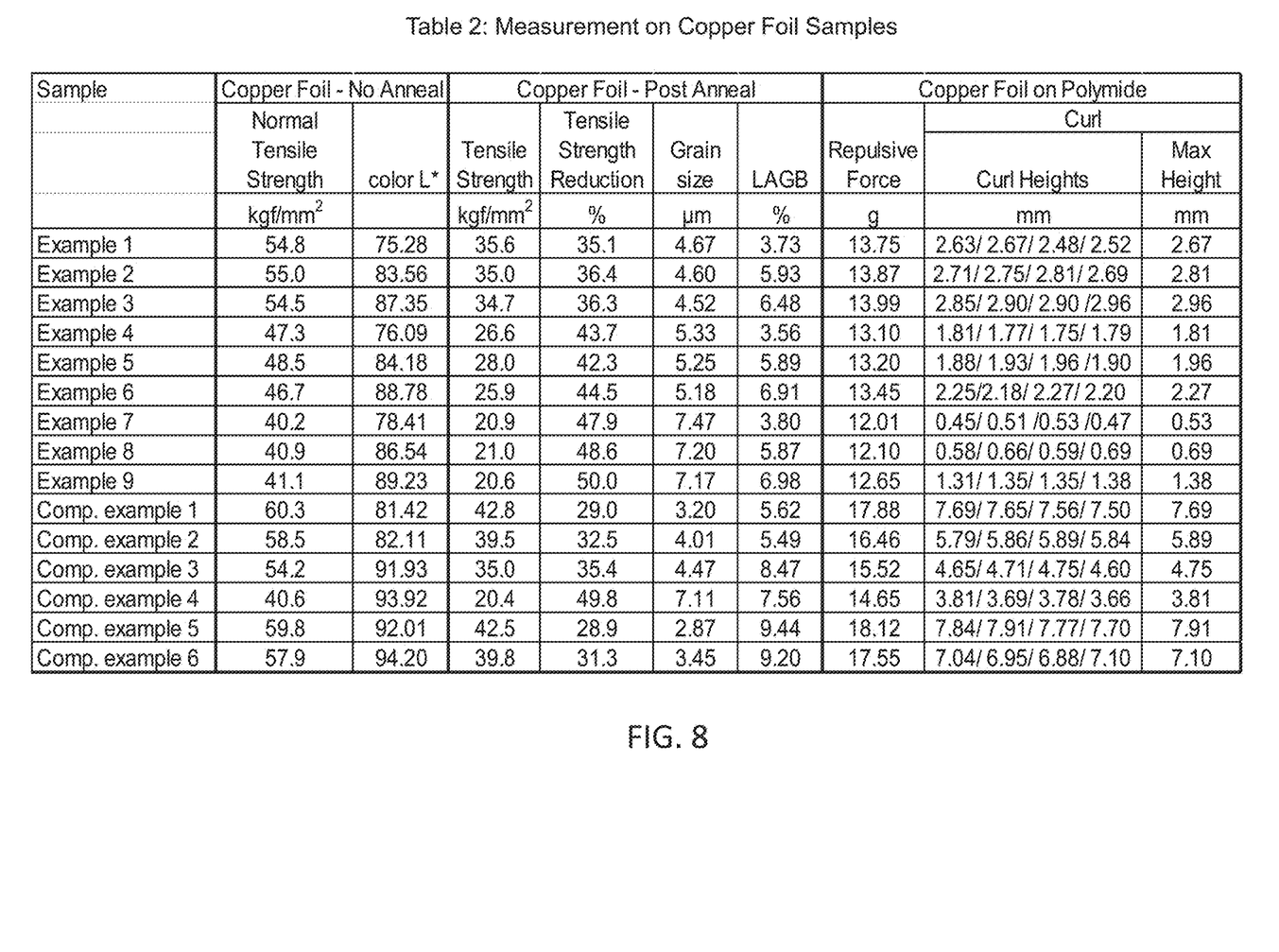
FIG. 8 is a table of various tests and measurements.

The results of the various measurements and tests are presented in Table 2, which is provided in FIG. 8. The data in Table 2 shows that copper foils manufactured according to the present disclosure exhibit an unexpected low repulsive force compared to conventionally manufactured copper foils.

Figure 9:
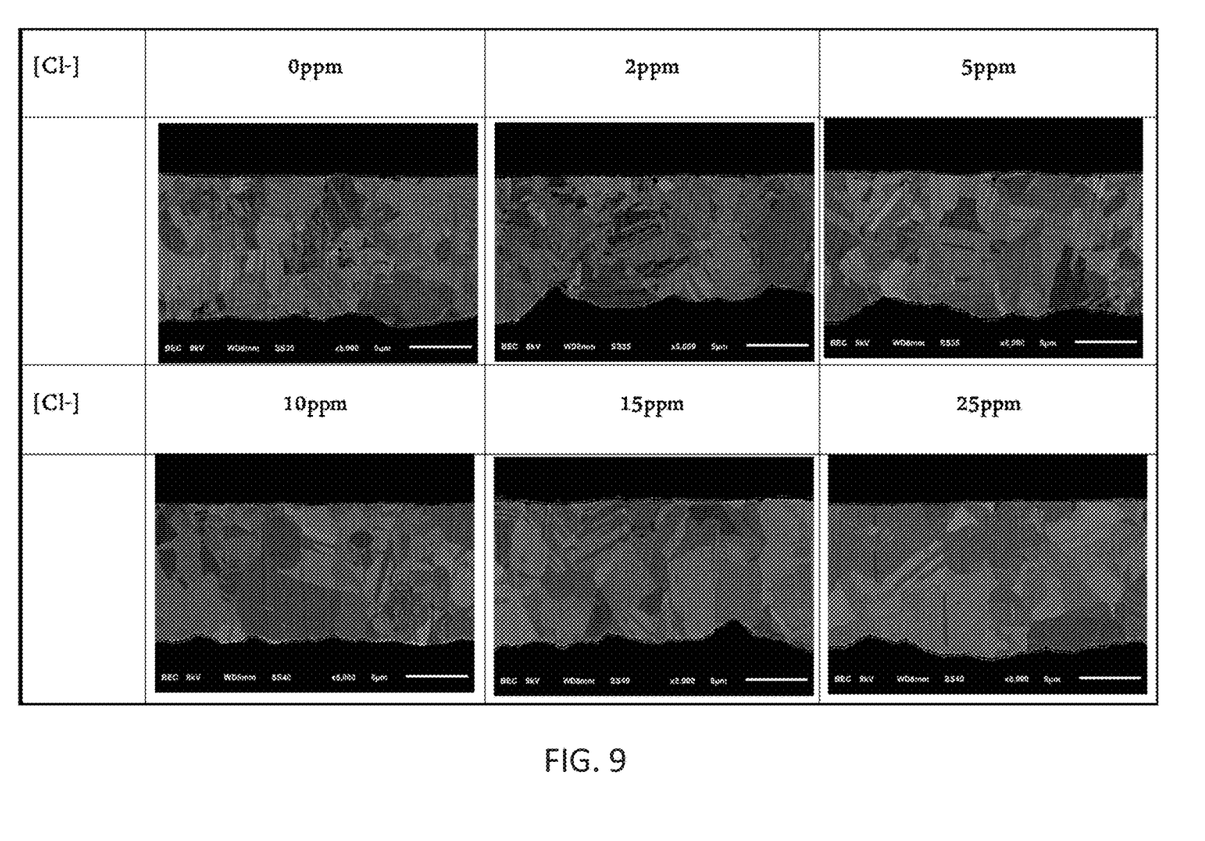
FIG. 9 is a series of cross-section images for copper foils manufactured with different amounts of chloride ion concentrations.

With respect to the grain size, the data in Table 1 and Table 2 also shows that as the amount of chloride ions increased, the normal tensile strength decreased and the grain size is enlarged after annealing. The tendency of grain size after annealing is also illustrated in FIG. 9. FIG. 9 shows a series of cross-section Scanning Electron Microscope (SEM) images of copper foil samples, after a 200° C., 1 hour anneal process, as described above, for chloride ion concentrations of 0 ppm, 2 ppm, 5 ppm, 10 ppm, 15 ppm, and 25 ppm. As can be observed from FIG. 9, as the chloride ion concentration is increased, the grain size is also increased during annealing. Thus increase in grain size also translates into a lower repulsive force. For example, at 0 ppm, the copper foil sample is found to have a repulsive force of 18 g. However, at 20 ppm, the repulsive force is reduced to 12 g.

According to Table 1 and Table 2, increasing current density resulted in higher LAGB and higher L*. If current density was too high, the repulsive force might be too large therefore induced large degree of curl.

Further, copper foils manufactured according to the present disclosure will generally exhibit:

(a) a lightness L* value of the nodule untreated side, based on the L*a*b color system, in the range of 75 to 90;

(b) a normal tensile strength in the range of 40 kgf/mm² to 55 kgf/mm².

(c) a low angle grain boundary (LAGB) percentage, as measured via electron backscatter diffraction (EBSD), of less than 7.0%.

(d) a grain size in the range of 4.5 µm to 7.5 µm; and (e) a degree of curl less than 3 mm.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. An electrodeposited copper foil comprising:
   (a) a lightness L* value of a nodule untreated side, based on the L*a*b* color system, in the range of 75 to 90;
   (b) a tensile strength in the range of 20 kgf/mm² to 29 kgf/mm², further comprising a low angle grain boundary (LAGB) percentage, as measured via electron backscatter diffraction (ESBD) of less than 7.0%.

2. The electrodeposited copper foil of claim 1, further comprising an anti-tarnish layer.

3. A flexible printed circuit comprising an electrodeposited copper foil according to claim 1.

4. An electronic component comprising a flexible printed circuit board according to claim 3.

5. An electronic device comprising an electronic component according to claim 3.

6. The electrodeposited copper foil of claim 1, further comprising a repulsive force, as measured via lamination repulsive force testing, of between 12 and 14 grams.

7. The electrodeposited copper foil of claim 1, further comprising a nodule treated side opposite the nodule untreated side.

8. The electrodeposited copper foil of claim 7, further comprising a passivation layer formed on the nodule treated side and the nodule untreated side.

9. The electrodeposited copper foil of claim 2, wherein the anti-tarnish layer is one selected from the group consisting of a chromate, substituted triazole, or combinations thereof.

10. An electrodeposited copper foil comprising:
    (a) a lightness L* value of a nodule untreated side, based on the L*a*b* color system, in the range of 75 to 90;
    (b) a tensile strength in the range of 20 kgf/mm² to 29 kgf/mm², further comprising a grain size in the range of 4.5 µm to 7.5 µm.

11. The electrodeposited copper foil of claim 10, wherein the grain size value is in the range of 7.0 µm to 7.5 µm and the degree of curl, as measured by the lamination curl test, is in the range of 0.45 mm to 1.5 mm.

12. The electrodeposited copper foil of claim 10, wherein the grain size value is in the range of 5.0 µm to 5.5 µm and the degree of curl, as measured by the lamination curl test, is in the range of 1.5 mm to 2.5 mm.

13. The electrodeposited copper foil of claim 10, wherein the grain size value is in the range of 4.5 µm to 5.0 µm and the degree of curl, as measured by the lamination curl test, is in the range of 2.5 mm to 3.0 mm.

14. An electrodeposited copper foil comprising:
    (a) lightness L* value of a nodule untreated side, based on the L*a*b* color system, in the range of 75 to 90;
    (b) a tensile strength in the range of 20 kgf/mm² to 29 kgf/mm², further comprising a degree of curl, as measured by the lamination curl test, is in the range of 0.45 mm to 3 mm.

15. An electrodeposited copper foil comprising:
    (a) a lightness L* value of a nodule untreated side, based on the L*a*b color system, in the range of 80.5 to 90; and
    (b) a tensile strength in the range of 20 kgf/mm² to 36 kgf/mm².

* * * * *